United States Patent
Castellón Mora et al.

(10) Patent No.: US 10,736,327 B2
(45) Date of Patent: Aug. 11, 2020

(54) NATURAL FUNGICIDE COMPOSITION

(71) Applicant: Griffith Foods International Inc., Alsip, IL (US)

(72) Inventors: Clevis Castellón Mora, Cartago (CR); Arianna Aronne Sparisci, San José (CR)

(73) Assignee: GRIFFITH FOODS INTERNATIONAL INC., Alsip, IL (US)

( * ) Notice: Subject to any disclaimer, the term of this patent is extended or adjusted under 35 U.S.C. 154(b) by 0 days.

(21) Appl. No.: 14/213,298

(22) Filed: Mar. 14, 2014

(65) Prior Publication Data

US 2014/0271950 A1 Sep. 18, 2014

Related U.S. Application Data

(60) Provisional application No. 61/784,032, filed on Mar. 14, 2013.

(51) Int. Cl.
*A61K 36/8962* (2006.01)
*A01N 65/24* (2009.01)
*A01N 65/22* (2009.01)
*A01N 65/00* (2009.01)
*A01N 65/42* (2009.01)

(52) U.S. Cl.
CPC .......... *A01N 65/24* (2013.01); *A01N 65/00* (2013.01); *A01N 65/22* (2013.01); *A01N 65/42* (2013.01)

(58) Field of Classification Search
None
See application file for complete search history.

(56) References Cited

U.S. PATENT DOCUMENTS

| | | | |
|---|---|---|---|
| 6,231,865 B1 * | 5/2001 | Hsu et al. | 424/739 |
| 2005/0244445 A1 | 11/2005 | Anderson | |
| 2007/0251020 A1 * | 11/2007 | Stockman | C14C 9/00 8/94.15 |
| 2008/0233202 A1 * | 9/2008 | Wurms et al. | 424/535 |
| 2010/0247684 A1 | 9/2010 | Reid et al. | |
| 2010/0297244 A1 * | 11/2010 | Khopade et al. | 424/489 |
| 2011/0268780 A1 | 11/2011 | Markus et al. | |

FOREIGN PATENT DOCUMENTS

| | | |
|---|---|---|
| EP | 0594319 A1 | 4/1994 |
| WO | 2004098767 A1 | 11/2004 |
| WO | 2011/140309 A2 | 11/2011 |

OTHER PUBLICATIONS

Alvindia, Inhibitory influence of biocontrol agents, plant oils and an inorganic salt on Mycosphaerella fijiensis and Cordana musae, the causal pathogen of black sigatoka and leaf spot of banana, 2012, African J Microbiology Research, 6: 4179-4184.*
Castellon, Clevis, "Assessments of vegetable oils in order to control the Black Sigatoka (*Mycosphaerella fijiensis*)", thesis for Universidad Nacional Costa Rica, School of Agricultural Sciences, 2010, 46 pages total, with English translation.
Morales, A., "Plant fungicides, natural effectiveness", <http://www.enbuenasmanos.com/articulos/muestra.asp?art=2347>, 2009, 5 pages with English translation.
Stauffer B., A., et al., "Selection of Plant Extracts with Fungicidal and/or Bactericidal Effects", Revista de Ciencia y Tecnologia Dirección de Investigaciones—UNA, 2000, 1(2):29-33, English abstract only.
Viveros Folleco, J., et al., "In Vitro Evaluation of Plant Extracts on Mycosphaerella fijiensis Morelet", Agronomia (Manizales), 2006, 14(1):37-50, English abstract only.
International Search Report and Written Opinion of the ISA/US issued in related application PCT/US2014/028812, dated Aug. 7, 2014, 7 pages.
Indian Patent Office Examination Report for Application No. 6037/CHENP/2015 dated Nov. 7, 2018 (7 pages).
Indonesian Patent Office Action for Application No. P-00201506473 dated Jan. 16, 2019 (3 pages, statement of relevance included).

\* cited by examiner

*Primary Examiner* — Terry A McKelvey
*Assistant Examiner* — Catheryne Chen
(74) *Attorney, Agent, or Firm* — Brinks Gilson & Lione

(57) ABSTRACT

A method for treating Black Sigatoka fungus in crops of the Musaceae family by applying a fungicidal composition comprising garlic oil, rosemary oil, thyme oil and cinnamon oil.

13 Claims, No Drawings

NATURAL FUNGICIDE COMPOSITION

CROSS-REFERENCE TO RELATED PATENT APPLICATIONS

This patent application claims the benefit of U.S. Provisional Patent Application No. 61/784,032, filed Mar. 14, 2013.

FIELD

This invention pertains to a natural fungicide for edible and ornamental crops of the Musaceae family and particularly for bananas and plantain crops. This natural fungicide is also believed to be useful generally as a fungicide for plants that thrive in warm and moist environments that are vulnerable to fungal diseases.

BACKGROUND

Bananas (*Mussa* spp) are one of the most important export products in Central America and elsewhere in the world. In banana and other related crops, fungi and bacteria can cause severe losses.

One of the main plant pathology problems that limit the banana production in Central America is Black Sigatoka which is caused by the fungus *Mycospharella fijiensis* Morelet. This disease of Black Sigatoka produces rapid deterioration of the plant leaves, affecting plant growth by decreasing photosynthetic capacity and reducing fruit quality.

Black Sigatoka is caused by the Ascomycete fungus, *Mycosphaerella fijiensis*, which is sexually and asexually produced during its life cycle. The asexual phase occurs early in the disease, in which a low number of conidiophores emerge from the stomata. The sexual phase produces a large number of ascospores, which are responsible for the spread of the disease by the wind. It can cause significant reductions in leaf area, yield losses of 50% or more and premature ripening, resulting in significant crop losses.

Currently, the most commonly used fungicides used in treating Black Sigatoka are dithiocarbamate and chlorothalonil. These products act on leaf surfaces to form a layer to impede fungi penetration. Systemic fungicides such as benzimidazoles and triazoles are also used.

It is highly desirable to use natural fungicides where possible to control fungi growth in plants since the natural fungicides are more environmentally friendly than conventional chemical fungicides and are preferred by both farmers and consumers. Since crops raised in warm, moist tropical environments are particularly subject to fungal growth, they require the application of substantial amounts of fungicides making the use of natural fungicides even more desirable.

While spices and herbs have been used in the past to inhibit bacteria, yeast and mold in crops, no natural composition has heretofore been discovered or disclosed which is as effective as conventional chemicals in controlling fungal growth in edible and ornamental crops of the Musaceae family or generally in plants that thrive in warm and moist environments that are vulnerable to fungal diseases. Therefore, if natural fungicides that are as effective as conventional chemicals in controlling fungal growth in edible and ornamental crops of the Musaceae family or generally in plants that thrive in warm and moist environments that are vulnerable to fungal diseases could be found this would bring important environmental and safety advantages.

SUMMARY

Embodiments of the natural fungicide may contain the following components:
garlic oil preferably obtained by steam distillation of bulbs of garlic *Allium sativum* L.
rosemary oil obtained by steam distillation of rosemary leaves, *Rosmarinus officinalis* L.
thyme oil extracted from thyme, *Thymus vulgaris*.
cinnamon oil distilled from the bark of *Cinnamomum zeylanicum*.
a blend of Butylated Hydroxytoluene (BHT) and Butylated hydroxyanisole (BHA) as an antioxidant. Other appropriate antioxidants can be used.
polysorbate as an emulsifier. Other appropriate emulsifiers such as propylene glycol alginate can be used.
xanthan gum as a suspension agent and emulsifier.
Concentration (% by weight) in natural fungicide composition (before dilution for application):
palm olein: about 70.0-80.0%
emulsifier: about 10.0-20.0%
garlic oil: about 2.0-5.0%
rosemary oil: about 0.5-2.5%
thyme oil: about 0.5-2.5%
cinnamon oil: about 0.5-2.5%
xanthan gum: less than about 1%
antioxidant blend: about 0-0.5%.
Optional ingredients:
spearmint oil or natural flavor at an appropriate level to give the composition a pleasant odor.
mineral oil at an appropriate level to act as a fungistatic agent.

DETAILED DESCRIPTION OF THE INVENTION

The following examples further illustrate embodiments of the invention but should not be construed as in any way limiting its scope.

Field Trials

Generally, commercial application of the natural fungicide embodiments will be by aerial spraying using aircraft or helicopters. Therefore, in this example, a natural fungicide composition in accordance with embodiments was applied on a field by nebulization, simulating aerial application. The natural fungicide used as a concentrate in this example contained, in percentages by weight:

palm olein: 74.500
emulsifier: 20.000
garlic oil: 2.000
rosemary oil: 0.500
thyme oil: 0.500
cinnamon oil: 0.500
xanthan gum: 0.500
antioxidant blend: 0.250
spearmint oil: 1.250.

Hydraulic sprayers were used to convert the composition (natural fungicide+water) into aqueous droplets. The concentrate blend was diluted in mineral oil before spraying at different concentration levels to deliver from 2 to 4 liters of the natural fungicide composition (concentrate blend) per hectare of banana plantation or 3.7 kg of the natural fungicide composition (concentrate blend) per hectare.

After different trials, the optimal application level was found to be 4 liters per hectare with approximately 32 applications per year. It is currently believed that the application level per hectare based on actives should be about 2 to 5 lt (1.8 to 9 kg) of the natural fungicide and about 2 to 7 liters of mineral oil per hectare. And, results can be optimized through synergistic action with systemic treatments and modifications to standard soil fertilization routines.

In this example, the application of 2 to 4 liters of the natural fungicide composition (concentrate blend) per hectare of banana plantation or 3.7 kg of the natural fungicide composition (concentrate blend) per hectare substantially prevented the formation of germinative tubes of Black Sigatoka (i.e., leaf damage according to the Stover scale). It is expected that the total number of applications necessary will vary depending weather conditions (rain amount, temperature, etc.), during the growing stage of the fruit.

Field Trial Results

Fungicidal results were obtained by measuring leaf damage according to the Stover leaf damage severity scale, modified by Gauhl, on a scale of 0 to 6 obtained by applying the following compositions in an experimental banana plantation during 15 weeks:
   Application of natural fungicide composition described above.
   Application of recognized chemical protectant fungicide.
   Application of mineral oil.
   No treatment applied.

At a concentration of 4 liter/hectare, the natural fungicide composition had results against Black Sigatoka fungus commensurate with the results obtained with a trusted chemical protectant fungicide, Dithane® 60SC, which is available from Dow Agrosciences (generic name of the active ingredient is mancozeb). The results for mineral oil alone were substantially inferior to those obtained with the natural fungicide and, in the absence of any treatment, the level of leaf damage was yet worse.

The results thus indicate that the experimental natural composition performs as a protectant fungicide as effectively as conventional chemical fungicides.

All references are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the ranges, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. The illustrated embodiments are exemplary only, and should not be taken as limiting the scope of the invention.

What we claim is:

1. A method for treating Black Sigatoka fungus in crops of the Musaceae family comprising:
   applying a fungicidal composition to the crops comprising garlic oil, rosemary oil, thyme oil and cinnamon oil in the following percentages by weight before dilution:
   garlic oil: about 2.0-5.0%
   rosemary oil: about 0.5-2.5%
   thyme oil: about 0.5-2.5%
   cinnamon oil: about 0.5-2.5%.

2. The method of claim 1 in which the garlic oil, rosemary oil, thyme oil and cinnamon oil of the fungicidal composition are dispersed in a vegetable oil.

3. The method of claim 2 in which the vegetable oil is palm olein.

4. The method of claim 2 in which the fungicidal composition includes an emulsifier.

5. The method of claim 4 in which the emulsifier is chosen from the group consisting of polysorbate, propylene glycol alginate, and mixtures thereof.

6. The method of claim 1 in which the fungicidal composition includes an antioxidant.

7. The method of claim 1 in which the fungicidal composition includes xanthan gum.

8. The method of claim 1 in which the fungicidal composition includes spearmint oil.

9. The method of claim 1 in which mineral oil is included in the fungicidal composition at an appropriate level to act as a fungistatic agent.

10. The method of claim 1 in which the fungicidal composition includes, in percentages by weight before dilution:
   palm olein: 74.500
   emulsifier: 20.000
   garlic oil: 2.000
   rosemary oil: 0.500
   thyme oil: 0.500
   cinnamon oil: 0.500
   xanthan gum: 0.500
   antioxidant blend: 0.250
   spearmint oil: 1.250.

11. The method of claim 1 in which the fungicidal composition is applied to banana crops.

12. The method of claim 11 in which the fungicidal composition is applied by aerial spraying.

13. A method for treating Black Sigatoka fungus in crops of the Musaceae family comprising applying to the crops a composition containing, in percentages by weight before dilution:
   palm olein: about 70.0-80.0%
   emulsifier: about 10.0-20.0%
   garlic oil: about 2.0-5.0%
   rosemary oil: about 0.5-2.5%
   thyme oil: about 0.5-2.5%
   cinnamon oil: about 0.5-2.5%
   xanthan gum: less than about 1%
   antioxidant blend: about 0-0.5%.

* * * * *

UNITED STATES PATENT AND TRADEMARK OFFICE
CERTIFICATE OF CORRECTION

| | |
|---|---|
| PATENT NO. | : 10,736,327 B2 |
| APPLICATION NO. | : 14/213298 |
| DATED | : August 11, 2020 |
| INVENTOR(S) | : Clevis Castellón Mora et al. |

It is certified that error appears in the above-identified patent and that said Letters Patent is hereby corrected as shown below:

In the Specification

In Column 2, Line 3, under "SUMMARY" insert missing paragraph:
--Embodiments comprise a composition containing spice essential oils and extracts dispersed in palm olein (or less preferably other vegetable oils), preferably containing antioxidants that prevent rancidity, and preferably also including an emulsifier to keep the product shelf stable and to aid in dispersion when it is diluted with water before application.--

In Column 3, Line 3, delete "It" and replace with --lt--

Signed and Sealed this
Twentieth Day of August, 2024

*Katherine Kelly Vidal*
Katherine Kelly Vidal
*Director of the United States Patent and Trademark Office*